Figure 1:
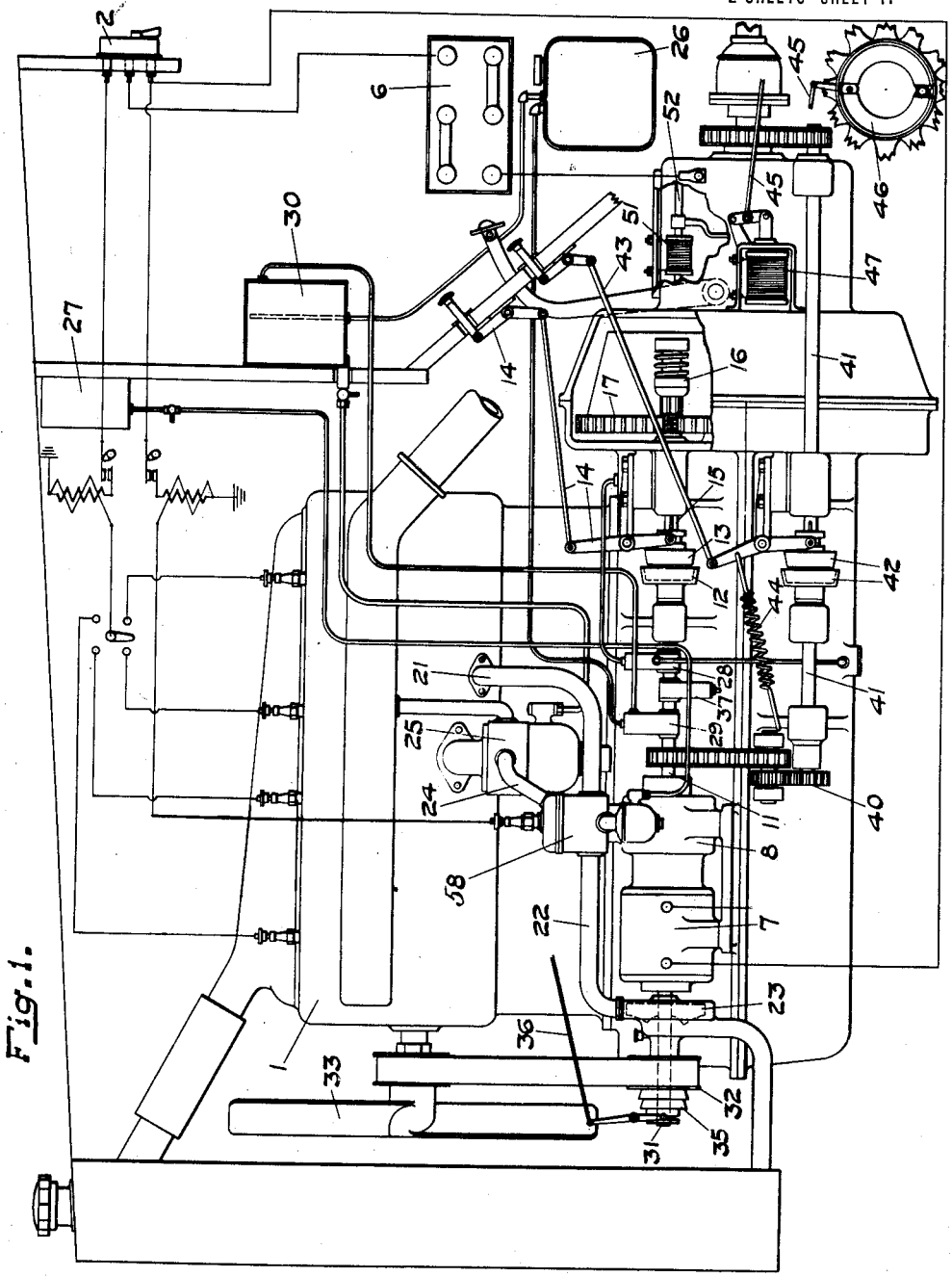

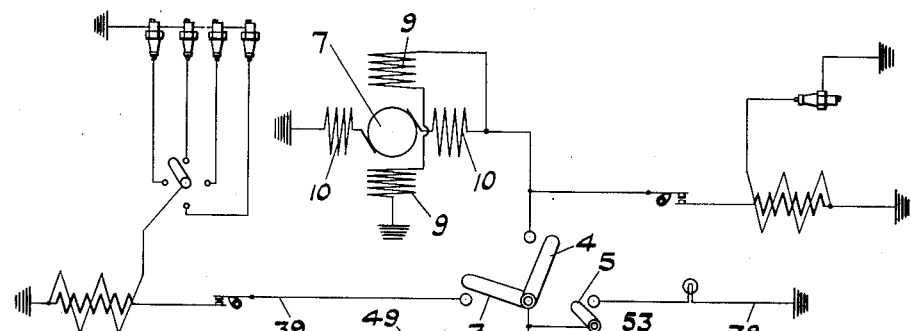
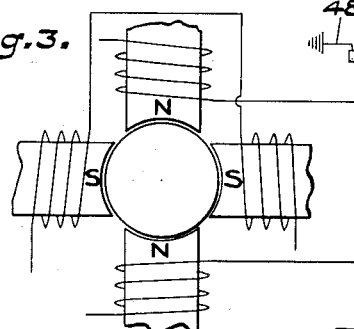
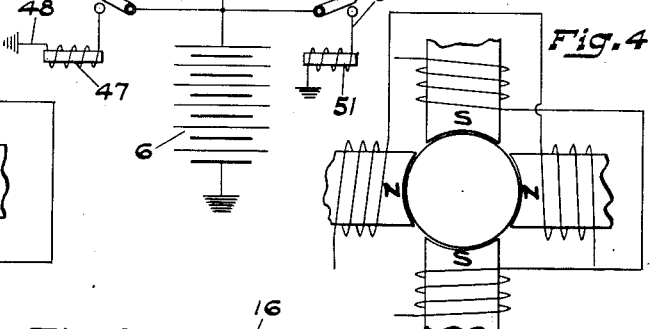
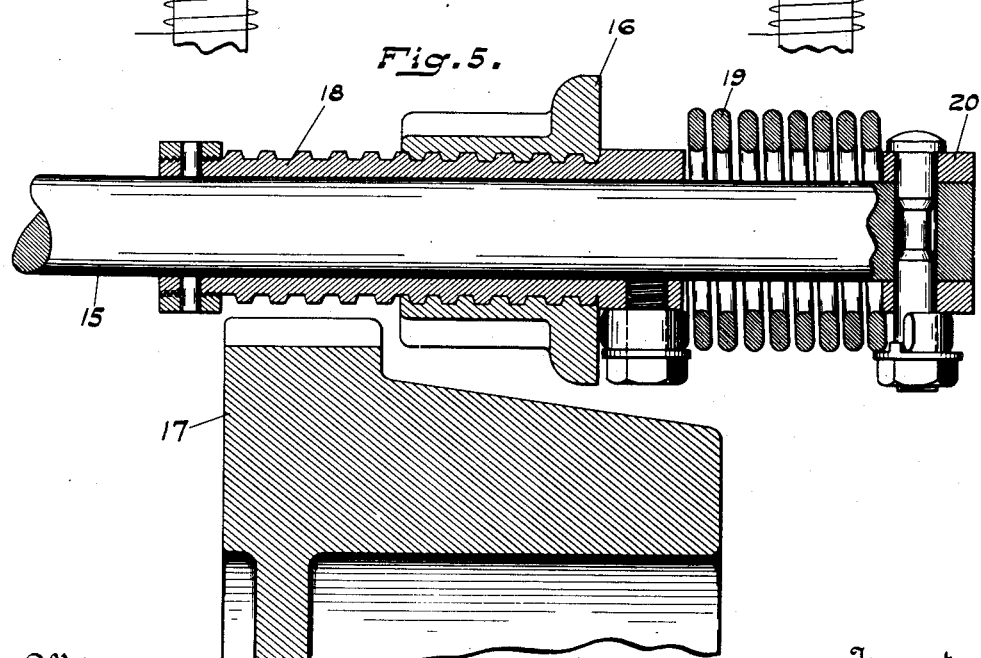

UNITED STATES PATENT OFFICE.

JOHN OTTO HEINZE, OF SPRINGFIELD, OHIO, ASSIGNOR OF ONE-HALF TO ALVIN F. KNOBLOCH, OF INDIANAPOLIS, INDIANA.

AUXILIARY POWER SYSTEM FOR INTERNAL-COMBUSTION ENGINES.

1,356,065.  Specification of Letters Patent.  Patented Oct. 19, 1920.

Application filed November 4, 1916. Serial No. 129,540.

*To all whom it may concern:*

Be it known that I, JOHN O. HEINZE, a citizen of the United States, residing at Springfield, Clark county, and State of Ohio, have invented and discovered certain new and useful Improvements in Auxiliary Power Systems for Internal - Combustion Engines, of which the following is a specification.

My invention relates to auxiliary power systems for internal combustion engines and its objects are to provide a power generating set additional to the main engine and including although not limited to all of these elements in all applications of the invention, an internal combustion engine of less power than the main unit, an electro-magnetic machine adapted to serve both as a motor and a generator, and a battery; the said generating set being adapted to supply power for all purposes auxiliary to the driving of the vehicle or other object to which power is to be supplied, and to automatically store its own energy in the battery; to provide means for the continuous delivery of such auxiliary power at a constant and uniform rate; to provide means whereby the starting of the main engine automatically may be effected from said auxiliary system; to provide means whereby the power of such starting operation may be supplied, if necessary, from either the auxiliary engine alone, the electro-magnetic machine alone or from both these elements, the last named condition being established and governed automatically by the demands for power and the voltage of the battery; to provide means whereby the auxiliary power system may be employed for direct driving of the driven object to thereby take the place of the main engine should the latter become disabled, and to thereby also obtain economy of fuel consumption by proportioning the power created to the power required, as when a vehicle is driven at moderate speeds; to provide means for such direct driving of the vehicle from the auxiliary power unit without operating the parts of the main engine, thereby avoiding loss of power; to enable the auxiliary power plant to be driven by the main engine; when desired, as for instance when the auxiliary engine is inoperative; to enable the size of the electro-magnetic machine to be reduced and its construction and regulating mechanism simplified as compared with the ordinary electric starter; to provide means for effecting the engagement of the auxiliary plant with the starting mechanism intermediate the same and the main engine after the said auxiliary power unit has attained its maximum speed and without an initial load upon such power unit; to provide for supplying heat from the auxiliary engine to the main engine to facilitate the starting of the latter and also to enable the employment of heavy liquid hydrocarbon in the main engine, if desired; to provide for driving the fan of the main engine at a fixed speed; to maintain a constant lighting circuit current irrespective of variations in the speed of the main engine; to provide for maintaining a constant feed of the lubricant of the main engine and a constant water circulation independently of variations in the speed of the main engine, together with an efficient utilization of power for driving the water pump; to insure a sufficient supply of liquid fluid for the main engine at the time of starting the latter; to provide means for electrically operating the brakes of a vehicle with effective force at such times when maximum force therefor is most needed and independently of the varying speed of the main engine and to provide for operating the change speed mechanism from electrical power controlled in supply independently of the main engine.

With these objects in view, my invention is embodied in preferable form in the arrangement, combinations and constructions hereinafter described and illustrated in the accompanying drawings.

In these drawings, Figure 1 is a side view in elevation of a part of the motor vehicle and its motor showing my invention applied thereto; Fig. 2, a diagrammatic view of the electric circuits; Figs. 3 and 4, detail views illustrating the directions of polarity when the electro-magnetic machine is operating respectively as a motor and as a generator; Fig. 5, an enlarged detail sectional view of the driving mechanism between the main engine and the auxiliary power unit.

Referring to the drawings, 1 is an internal combustion engine constituting the main motor, and a switch 2 on the dash or other convenient place controls the auxiliary power unit and lighting circuits.

This switch is shown in Fig. 2 as comprising three arms 3, 4 and 5, the arms 3 and 4 respectively controlling the main ignition circuit and the auxiliary power unit circuit, and the arm 5 controlling the lighting circuit. 6 is an electric storage battery constituting one of the primary sources of energy of the generating set and across the line of the battery is an electro-magnetic machine 7 which is adapted to serve either as a motor or as a generator, the change from one to the other function being automatically effected by the overbalancing of counter electro-motive forces.

On the shaft of the motor generator 7 is an internal combustion engine 8 of less power capacity than the main engine but of sufficient power to drive the generator, to start the main engine and to drive the vehicle or other object at moderate speeds independently of the main engine. The electro-magnetic machine and the battery are of such capacity that when said machine is acting as a motor its capacity is not only sufficient to start the auxiliary engine but also to add its power to that of the auxiliary engine either when the latter is running at low speeds or at its maximum so as to aid in rotating the auxiliary engine shaft and thus assist in starting the main motor or driving the driven element ordinarily driven by said main motor.

To this end the said motor generator is provided with a series winding 10 in series with the armature and a shunt winding 9 in the field, as indicated in Fig. 2, and when a current is thrown through the electromagnetic machine from the battery exciting the armature, the machine will be driven as a motor and the condition of polarity then existing is illustrated in Fig. 3. The number of ampere turns of the series winding is made so much greater than that of the shunt winding as to overcome the electromotive force through the latter, thus running the machine as a motor and starting the small engine and also adding its power to that of the engine in turning the line shaft so as to assist in starting the main engine. For example, the series winding would have 2000 ampere turns to 1000 ampere turns of the shunt winding.

When, however, the small engine reaches its full speed it will over-run the motor and cause the latter to act as a generator reducing the ampere turns of the series winding and thus relatively increasing the ampere turns of the shunt winding whereby the electro-motive force of the latter will be greater than that of the series winding and the current from the generator will be directed to the battery, recharging the latter. This recharging action, however, will take place only when the voltage of the battery is decreased considerably, and, normally, the electric potential of the battery and generator is such that even when the auxiliary engine is running at maximum speed the electro-magnetic machine will operate as a motor and, therefore, assist the auxiliary engine, assuming of course that the voltage of the battery is sufficiently high.

The power capacity of the dynamo is not only sufficient to aid the auxiliary engine in starting but is great enough to turn the main engine through the shaft of the auxiliary engine should the latter be disabled. Therefore, there is provided a power generating set comprising an electrical power unit and an explosive engine power unit either of which is of sufficient capacity to start the main engine through the mechanism hereinafter described and either of which may be used to drive the vehicle or other object being driven independently of the main engine, by means hereinafter described, or which units may act conjointly in producing and delivering power sufficient for the above purpose.

The auxiliary engine is preferably adapted to operate continuously and when so operating it has a fixed speed, and consequently drives the motor generator and the other parts to which it is connected at a uniform speed, which is an important factor in delivering current of constant amperage to the battery for recharging purposes and also of advantage in connection with the utilization of the engine for driving other mechanisms, as compared to the usual system in which the main engine is employed to recharge the battery and perform said other functions and in which arrangement the power delivered from said main engine varies, of course, with the variation of the speed thereof.

The shaft of the auxiliary prime mover 8 is continued to form a line shaft 11 which is provided at its outer end with a clutch member 12 adapted to engage a slidable clutch member 13 operable manually by a foot pedal. The clutch member 13 is keyed on a driven shaft 15 (see Fig. 5) which carries an automatically engaging flexibly mounted starting pinion 16 which is adapted to mesh with and drive a large gear 17, carried by the fly-wheel of the main engine shaft. The pinion 16 is screw threaded on a rotatable sleeve 18 mounted on the shaft section 15 and flexibly connected by a spring 19 with a collar 20 fixed on the said shaft section 15. By this arrangement when a sudden spinning of shaft 15 is effected by the engagement of the clutch members 12 and 13, a tension will be imparted to the spring 19 and when this tension reaches a certain point the sleeve 18 will be turned through the spring connection and pinion 16 will be automatically screwed into engagement with the fly-wheel gear, such engagement being yieldingly effected. The fly-wheel gear will then be rotated and turn the main engine shaft, thus starting the engine and when the latter reaches a high speed, it will overrun the pinion 16 and screw the latter out of mesh with the gear 17, thus effecting the automatic release of the starting mechanism from the main engine shaft. This form of intermediate driving mechanism for a starter is well known as the "Bendix Drive" and this specific construction constitutes no part of my invention which is directed so far as the starting drive connection is concerned to the combination of an automatically engaging and an automatically releasing starting driving element with an auxiliary engine and a disconnected manually controlled connection between such engine and said element, whereby no load is imposed on the auxiliary engine when the latter is starting.

After the main engine has been started the manually controlled foot lever 14 is released by the driver.

The auxiliary engine is provided with a water circulation system which is interconnected by pipes 21 and 22 with the water circulation of the main engine and radiator whereby the heat generated in the auxiliary engine water system may be utilized to heat the main engine through the water jacket of the latter for the purpose of facilitating the starting of the motor and which heating is of particular advantage in cold weather. Coöperating with the water pipe 22 and with the line shaft of the auxiliary engine is a water pump 23 which is of the centrifugal type and which is mounted directly on said shaft and which pump owing to the centrifugal type and to the fact that the small engine has a fixed speed may be exactly proportioned to the capacity of said engine and thus the entire power delivered to the pump utilized, thereby obtaining an increased efficiency in driving the pump as distinguished from those arrangements in which the same is driven by the main engine which owing to the variable speeds will either drive the pump at such an excessive speed as to result in a loss of power, or will not drive it sufficiently fast, as when the engine is operating slowly under a heavy load.

A conduit 24 leads from the exhaust 58 of the auxiliary engine to the space surrounding the carbureter 25 of the main engine whereby the liquid hydrocarbon fuel of the motor may be heated to vaporize the same. By this arrangement it is possible to employ kerosene, low grade gasolene or other relatively heavy fuel for the main engine. When it is desired to employ the relatively heavy fuel for the main engine and to run the small engine on a more volatile fuel, a liquid fuel tank 26 is provided for the main engine and a separate fuel tank 27 for the auxiliary engine.

Connected to and operated from the line shaft of the auxiliary engine is a pump 28 which is connected with the lubrication system of the main engine, the auxiliary engine and other operating parts, and whereby oil is adapted to be forced through the system. The direct connection of this oil pump with the constantly running auxiliary engine provides for a constant supply of lubricant to the operating parts automatically and at the same time when lubrication is most required, viz., when the main engine is about to be started and also in cold weather when the lubricant frequently becomes congealed. Injury to the operating parts due to an insufficient supply of oil when starting is thus avoided.

In order to insure that the main engine shall be supplied at the start thereof with a sufficient quantity of liquid fuel, a pump 29 is directly connected to the line shaft of the auxiliary engine and communicates with a small overflow supply tank 30 near the top of the dash or at another convenient point from which the gasolene may feed to the main engine carbureter.

In line with the shaft 11 of the auxiliary engine and motor generator is a shaft section 31 carrying a pulley 32 which in turn drives a fan 33 adapted to draw air through the radiator to cool the water. By its connection to the auxiliary engine this fan is operated independently of the main engine and when operated is driven at a fixed speed. This is a point of particular importance since it insures the driving of the fan with maximum effect when most needed, and when by the present mode of connection with the main engine it is least effective, that is, when the engine is running under a heavy load at slow speeds, as when a hill is being ascended by the vehicle. In order to disconnect the fan from the auxiliary engine which disconnection may be desired in cold weather or when the motor is being started, a cone clutch 35 is interposed between the shaft section 31 and the line shaft of the engine and this clutch is adapted to be controlled by a suitable manually operable rod 36.

The shaft of the auxiliary engine may also be connected to a tire pump 37.

Connected to the battery and receiving current therefrom is a lighting circuit 38 including the required number of electric lamps. This circuit is controlled by the switch 5. The direct connection of the lighting circuit with the battery renders it possible to cut off the motor generator and auxiliary engine if desired, while maintaining a circuit through the lamp.

The main engine has an ignition circuit 39 which is independent of the ignition circuit of the auxiliary engine.

The auxiliary power plant is also adapted to serve as a means for driving the vehicle or other object to be driven, and without operating the main engine. The purpose of such an arrangement is to provide a source of power capable of being utilized either when the main engine is disabled or to drive the vehicle or other object at moderate speeds with the power unit proportioned in capacity to the power required, to thereby produce an increase in efficiency and economy in consumption of fuel. The invention also contemplates the use of the entire auxiliary power plant to effect this independent driving operation or the use of the electrical unit alone or the internal combustion engine alone, of such auxiliary power plant.

To the above end, the line shaft of the auxiliary engine and motor generator is connected by a chain and sprocket drive 40 with a counter shaft 41 adapted to be continuously driven from the line shaft and formed in two shaft sections which are adapted to be coupled together by a clutch 42 which is operable in one direction by a manually controlled foot pedal lever 43, extending through the dash or otherwise conveniently located, and in the other direction by means of a spring 44. The driven section of this counter shaft is connected by means of a chain and sprocket drive directly to the transmission shaft of the vehicle or other means to be driven, thus effecting a drive connection from the auxiliary plant around the main engine whereby the power plant may drive the vehicle or other object without the load of the operating parts of the main motor. The motor generator is made of such capacity that it may drive the vehicle through the connection above described and through the auxiliary engine by its own power. This arrangement permits the vehicle to be driven when both the main engine and the small engine are incapable of operating.

The invention also contemplates the connection of the auxiliary power system to the electrically operated brakes. In such arrangement the brake rods 45, connected to brakes 46 are operated by solenoids 47, electrically connected by conductors 48 to the battery, the circuit through the battery and solenoids being controlled by a switch 49. This combination insures a supply of current from a source which is constantly replenished at a fixed rate, namely, from the auxiliary engine and therefore, enables maximum braking to be obtained when most needed, and when, under the usual condition of recharging from the main engine, the latter is most efficient, that is, when the vehicle is descending a hill and the engine is coasting or running slowly, while at the same time this arrangement also overcomes the necessity for an objectionably large battery and a large motor generator such as would be required in connection with a main engine recharging connection to attain the function of maximum braking effect at maximum demands.

Leading from the battery are conduits 50, adapted to supply energizing current to solenoids 51, which operate a gear shifting mechanism 52. This arrangement permits the change speed mechanism to be operated electrically without any demand upon the main engine for supply of electrical energy in the primary source. The circuit for this gear shifting mechanism is controlled by a switch 53.

In the operation of the power system, the main switch 4, is thrown on battery, whereupon the circuits through the battery, motor generator and ignition system of the auxiliary engine will be established, whereby the electromagnetic machine will be caused to run as a motor on current from the battery and will drive the shaft of the small auxiliary engine until the latter attains its full speed, and will continue to impart power to the auxiliary engine shaft until the voltage in the battery decreases to such a point that the electro-motive force from the shunt winding will overcome the electro-motive force of the series winding. The auxiliary engine has a fixed adjustment of the carbureter and throttle-valve and thus runs at a fixed speed. Preferably the auxiliary engine is permitted to run continuously which condition may be economically maintained owing to the comparatively small fuel demands of the engine.

After it attains its normal speed, which will be in a space of time probably less than a minute, the driver of the car, assuming that the system is applied to a motor vehicle, may permit it to run freely for a sufficient period of time to establish circulation of the lubricant to supply sufficient gasolene to the small feed tank for the main engine and to heat the water in the entire connected circulation system of the two engines and also permit the exhaust of the auxiliary motor to heat the carbureter of the large one. Then the operator throws in the manually controlled clutch 12, 13 whereby the shaft section 15 is connected to the auxiliary engine shaft and a rapid spinning movement given to such shaft section, causing the threaded pinion 16 to be automatically and yieldingly carried into mesh on the main engine shaft fly wheel, whereupon the main shaft will be given a sufficient number of revolutions to start the engine and after the latter is started the driving pinion of the starting mechanism will be overrun by the greater speed of the engine shaft and automatically carried back out of mesh with the main shaft gear wheel.

Should it be desired to run the vehicle directly from the auxiliary power plant, the clutch on the counter shaft 41 is connected to the shaft of the auxiliary power system so as to thereby connect the latter directly with the transmission.

In the event that the auxiliary engine becomes inoperative for any reason, it may be desirable to drive the auxiliary power generating system from the main engine for the purpose of recharging the battery and also supplying power to the various driven elements ordinarily operated by the auxiliary engine. The clutch driving connection between the transmission shaft of the main engine and the shaft of the auxiliary engine through the countershaft enables this reverse driving operation to be effected.

Having thus described my invention, what I claim is:

1. The combination with an internal combustion engine and a mechanism connectable therewith and to be driven thereby, of an auxiliary power plant, means for connecting said power plant to start the internal combustion engine, means for connecting said power plant to independently of said engine operate the mechanism and means to disconnect it from either of said connections, substantially as set forth.

2. The combination with an internal combustion engine and a mechanism connected to be driven thereby, of an auxiliary power source comprising separate units, means for connecting said units to start the internal combustion engine, means for connecting said power units to independently of said engine operate the mechanism, and means to wholly disconnect the same therefrom, substantially as set forth.

3. The combination with an internal combustion engine and a mechanism connected to be driven thereby, of an auxiliary power source comprising separate units, means for starting one of said units from the other, means for employing either or both of said units to start the internal combustion engine, and means for connecting said power units to independently of said engine operate the mechanism, and to wholly disconnect the same therefrom, substantially as set forth.

4. The combination with an internal combustion engine and a mechanism connected to be driven thereby, of an auxiliary power source comprising separate units, connectable and disconnectable means for employing either or both of said units to start the internal combustion engine, and means for connecting said power units to independently of said engine operate the mechanism and to be wholly disconnected therefrom, substantially as set forth.

5. The combination with an internal combustion engine and a mechanism connected to be driven thereby, of an auxiliary power source comprising separate units, means for employing either or both of said units to start the internal combustion engine, and means for connecting either or both of said power units to independently of said engine operate the mechanism and to be wholly disconnected therefrom, substantially as set forth.

6. The combination with a main internal combustion engine and a mechanism connected to be driven thereby, of an auxiliary power source comprising an electric motor and a second internal combustion engine, means for employing either or both units of the auxiliary power source to start the main internal combustion engine, and means for connecting either or both of said auxiliary power units to independently of said engine operate the mechanism, substantially as set forth.

7. The combination with a main internal combustion engine and a mechanism connected to be driven thereby, of an auxiliary power source comprising a dynamo-electric machine and a second internal combustion engine, said second internal combustion engine operable to run the dynamo-electric machine as a generator, a transmission, means for automatically connecting the auxiliary power source with said transmission when said power source has attained approximately its maximum speed, means for manually effecting a driving connection between the driven transmission and the main internal combustion engine to start the same, and means for independently of said engine operating said mechanism from either or both units of the auxiliary power source, substantially as set forth.

8. The combination with a main internal combustion engine and a mechanism connected to be driven thereby, of an auxiliary power source operable independently of said engine comprising a dynamo-electric machine and a second internal combustion engine, a transmission, means for starting the main internal combustion engine through said transmission from either or both units of said auxiliary power source, means for automatically disconnecting said transmission driving connection when the main internal combustion engine overruns the auxiliary power source, and said auxiliary power source operable from the main internal combustion engine, substantially as set forth.

9. The combination with a main internal combustion engine and a mechanism connected to be driven thereby, of an auxiliary power source operable independently of said engine comprising a dynamo-electric machine and a second internal combustion engine, said units of the auxiliary power source being reciprocally operable each from the other, and an apparatus associated with the main engine adapted to be continuously operated by the auxiliary power source and to be wholly disconnected therefrom, substantially as set forth.

10. The combination with a main internal combustion engine and a mechanism connected to be driven thereby, of an auxiliary power source operable independently of said engine comprising a dynamo-electric machine and a second internal combustion engine, said units of the auxiliary power source being reciprocally operable each from the other, and means for employing either or both of said auxiliary power units to independently operate the mechanism and the main internal combustion engine, substantially as set forth.

In witness whereof, I have hereunto set my hand and seal at Indianapolis, Marion county, Indiana, this 29th day of September, A. D. nineteen hundred and sixteen.

JOHN OTTO HEINZE. [L. S.]

Witnesses:
A. C. RICE,
H. P. DOOLITTLE.